Jan. 16, 1962 G. R. RENNER ETAL 3,017,563
MOTOR VEHICLE POWER GENERATION
Filed May 12, 1958 3 Sheets-Sheet 1

INVENTORS
Glen R. Renner
BY Lyman A. Rice
Their Attorney

INVENTORS
Glen R. Renner
BY Lyman A. Rice

Their Attorney

Jan. 16, 1962   G. R. RENNER ETAL   3,017,563
MOTOR VEHICLE POWER GENERATION
Filed May 12, 1958   3 Sheets-Sheet 3

INVENTORS
Glen R. Renner
BY Lyman A. Rice
Their Attorney

United States Patent Office 3,017,563
Patented Jan. 16, 1962

3,017,563
MOTOR VEHICLE POWER GENERATION
Glen R. Renner and Lyman A. Rice, Anderson, Ind., assignors to General Motors Corporation, Detroit, Mich., a corporation of Delaware
Filed May 12, 1958, Ser. No. 734,648
19 Claims. (Cl. 322—90)

This invention relates to power generating apparatus for the electrical system of a motor vehicle wherein the power generating apparatus is driven at widely varying speeds by the prime mover or engine of the motor vehicle.

One of the problems encountered in present-day motor vehicle electrical systems is satisfying the ever increasing electrical power requirements of the motor vehicle. This demand for power has increased steadily over the years due to the addition of various electrically operated accessories to the motor vehicle.

This problem is aggravated in the case of motor vehicles because the motor vehicle electrical system is essentially a constant-voltage system and because the generator of the system is driven at widely varying speeds by the prime mover of the vehicle. Thus, at idling speeds it is desirable to have sufficient generator output to at least partially supply the electrical loads of the vehicle. Since the voltage output of a generator is directly proportional to speed, sufficient output to supply the loads at idling speed may be achieved through suitable step-up speed changing mechanism that drives the generator at a much higher speed than the speed of the engine. When this is done, however, the generator is driven at still a higher speed when the vehicle is being driven in a higher speed range due to the fixed speed ratio between the engine of the vehicle and the generator. In many instances this high speed of rotation of the generator causes breakdown of the generator due to overheating and due to mechanical failures.

It is accordingly an object of this invention to provide a power generating system for a motor vehicle wherein sufficient power is supplied to feed the electrical loads of the motor vehicle at all operational speeds of the vehicle prime mover, and wherein the power generating unit does not become damaged either electrically or mechanically when the vehicle is operating in its high speed range.

Another object of this invention is to provide a pair of power sources that derive their motive power from a prime mover of a motor vehicle and which supply power to feed the electrical loads of the vehicle, the power sources being alternately connected in series and in parallel to feed the loads of the vehicle.

Still another object of this invention is to provide a pair of power sources that derive their motive power from a prime mover of a motor vehicle and which supply power to feed the electrical loads of the vehicle, the power sources being alternately connected in series and in parallel in response to the current output of the power sources or in response to a condition of operation of the vehicle prime mover.

Still a further object of this invention is to provide a direct-current generator having a field winding and an armature that is provided with two separate armature windings that are each connected respectively with a respective commutator. The armature of the generator is driven by the prime mover of a motor vehicle and the two armature windings are alternately connected either in series or in parallel in response to the current output of the armatures or in response to a condition of operation of the prime mover such as the speed of the prime mover.

Further objects and advantages of the present invention will be apparent from the following description, reference being had to the accompanying drawings wherein preferred embodiments of the present invention are clearly shown.

Figures 1, 2, 3:
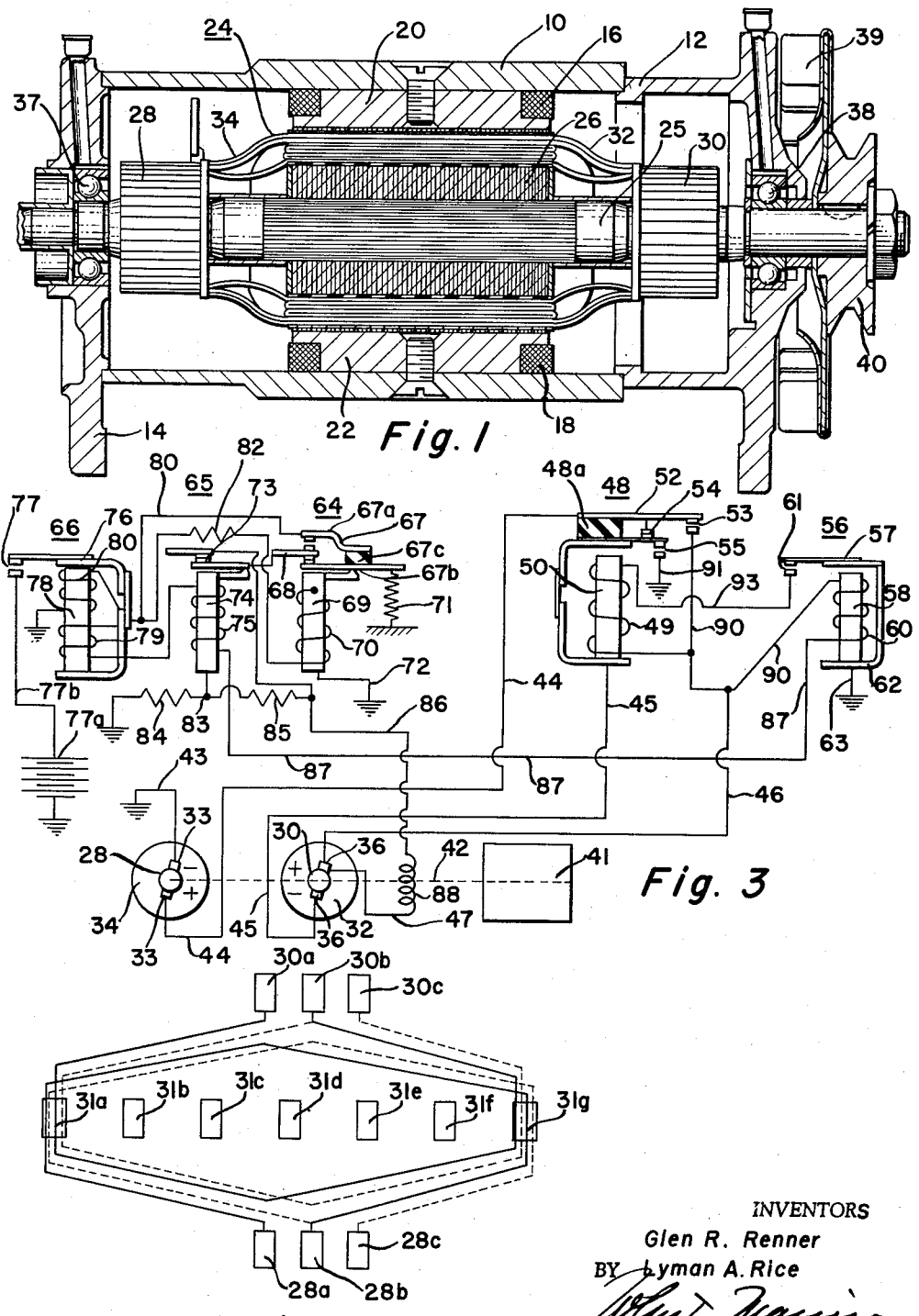
FIG. 1 is a vertical sectional view of a dynamo-electric machine made in accordance with this invention.
FIG. 2 is a diagrammatic illustration of an armature winding diagram of the armature shown in FIG. 1.
FIG. 3 is a control circuit diagram illustrating a motor vehicle electrical system employing the generator of FIG. 1 and wherein the armature windings of the generator are connected either in series or in parallel in response to the current output of the armature windings.

Referring now more particularly to FIG. 1, the direct-current generator of this invention is illustrated. The generator comprises a main frame 10, a drive end frame 12, and a second end frame 14. The frames 10, 12, and 14 are held in fixed relationship with one another by one or more through bolts (not shown). The main frame 10 supports field coil windings 16 and 18 which are wound on pole shoes 20 and 22. The pole shoes are fixed to the frame 10 by threaded fasteners, as shown. The generator further includes an armature generally designated by reference numeral 24. The armature is comprised of a shaft 25, a laminated core 26, and a pair of commutators 28 and 30. The laminations of core 26 are fixed relative to shaft 25 for rotation therewith as are the commutators 28 and 30. The armature 24 furthur includes a first armature winding 32 that is connected with commutator 30 and a second armature winding 34 that is connected with commutator 28. These armature windings have an equal number of turns.

The winding layout of windings 32 and 34 is illustrated in the winding diagram of FIG. 2. In the winding diagram of FIG. 2 the commutator segments of commutator 30 are designated by reference numerals 30a, 30b and 30c, whereas the commutator segments of commutator 28 are designated by reference numerals 28a, 28b and 28c. The armature slots in FIG. 2 are designated by reference numerals 31a, 31b, 31c, 31d, 31e, 31f and 31g. It can be seen from the winding diagram of FIG. 2 that the conductors of each armature winding 32 and 34 pass through common slots of the armature. It will also be readily apparent from this winding diagram that two separate armature windings are provided on a single laminated core. With this arrangement the armature will provide two separate voltage outputs at commutators 28 and 30 respectively.

The generator also has suitable brushes not shown in FIG. 1 for taking off the voltage output from commutators 28 and 30. These brushes are illustrated in the circuit diagram of FIG. 3 and are designated by reference numerals 33 and 36. The shaft 25 of the armature 24 is supported in ball bearings 37 and 38 located respectively in the end frames of the generator. The shaft carries an air circulating fan 39 and a pulley 40 which may be belt driven in the usual manner by the engine of a motor vehicle.

Referring now more particularly to FIG. 3 a preferred electrical circuit diagram that employs the two-commutator generator of FIG. 1 is shown. In FIG. 3 the armature windings are once more designated by reference numerals 32 and 34 and are shown as being driven by a motor vehicle engine designated by reference numeral 41. The engine drives the armature through suitable torque transmitting means 42 that may be the fan belt of a motor vehicle. In the circuit diagram of FIG. 3 one of the brushes 33 that contacts commutator 28 is connected directly to ground by a lead 43. The other brush 33 is connected with a lead 44. One of the brushes 36 that contacts commutator 30 is connected with a lead 45 whereas the other brush is connected with leads 46 and 47.

The other electrical components of the circuit shown in FIG. 3 include a relay generally designated by reference numeral 48. This relay has a coil winding 49, a metal core 50 and an armature designated by reference numeral 52. This relay further includes switch contacts 53, 54 and 55, there being an insulating block 48a separating two metal conducting portions of the armature.

The circuit components for the control circuit of FIG. 3 include a second relay generally designated by reference numeral 56 and including an armature 57, a metal core 58, a coil winding 60 and switch contacts 61. The armature 57 is pivotally supported by a metal frame 62 that is connected directly to ground by a lead 63.

The circuit of FIG. 3 also includes a voltage regulator, a current regulator, and a cut-out relay designated respectively by reference numerals 64, 65 and 66. The voltage regulating relay is of the electromagnetic vibratory type having an armature 67 formed of two metal parts 67a and 67b that are separated by an insulator 67c. The metal parts or arms 67a and 67b have switch contacts that cooperate with contacts located on a fixed metal part 68. This voltage regulating relay further includes a metal core 69, a coil winding 70 and a spring 71 for holding the armature in a position to connect metal parts 68 and 67b through the lower set of switch contacts. One side of the coil winding 70 is connected directly to the metal core 69 and this metal core is connected to ground through a lead 72.

The current regulating relay 65 includes switch contacts 73, a metal core 74, a coil winding 75 and a spring (not shown) for normally holding the contacts 73 in a closed position. This relay is of the well-known electromagnetic vibratory type.

The cut-out relay 66 includes an armature 76, switch contacts 77, a metal core 78 and series and shunt coil windings denoted respectively by reference numerals 79 and 80. This relay is of a type well known to those skilled in the art and connects the armature windings of the generator with the storage battery of a motor vehicle electrical system when the generator is producing a predetermined output voltage.

The upper metal part 67a of voltage regulating relay 67 is connected with the armature 76 of cut-out relay 77 through a lead 80. The lower metal part 67b of relay 64 is connected directly to ground through metal core 69. A resistor 82 is connected between the frame of relay 66 and the actuating coil 70 of relay 64. The core 74 of relay 65 is connected with a junction 83, which is, in turn, connected between resistors 84 and 85. The opposite side of resistor 84 is connected directly to ground, as shown, whereas the opposite side of resistor 85 is connected with a lead 86. One side of coil winding 75 of relay 65 is connected with coil winding 79 of relay 66 while the opposite side of coil winding 75 is connected with a lead 87.

The field windings 16 and 18 of the generator illustrated in FIG. 1 are designated in their entirety by reference numeral 88 in FIG. 3. It is seen that one side of this field winding is connected with lead 86. With this arrangement the current flow through field winding 88 is controlled by the voltage and current regulating relays 64 and 65 in a manner to be more fully described hereinafter. The opposite side of the field winding is connected with one brush 36 via lead 47. One side of switch contacts 53 of relay 48 is connected with a lead 90 which serves as a common connection for one side of coils 49 and 60 and lead 46. The contacts 54 of relay 48 are connected between the upper and lower metal parts of the armature 52 of relay 48. One of the switch contacts 55 is connected to the lower metal part of armature 52 whereas the other switch contact is connected directly to ground via a lead 91.

The operation of the circuit shown in FIG. 3 will now be described. When starting up from shut-down condition, the armature windings 32 and 34 of the generator shown in FIG. 1 are connected in series. This circuit may be traced from lead 43, through armature winding 34, through lead 44, through contacts 54, through the frame of relay 48, through lead 45, through armature winding 32, through lead 46, through coil winding 60 and thence through lead 87 to the current regulator 65. It can be seen that the switch contacts of relay 48 control the connection of the armature windings 32 and 34, and when the armature of relay 48 is in the position illustrated in FIG. 3 the armature windings of the generator are connected in series. In this condition of operation, the coil 49 of relay 48 is deenergized so that the contacts 54 of relay 48 are closed while the contacts 53 and 55 remain open. The series connection remains in effect through the idling speed range of the engine 41 because of the limited capacity of a generator to produce output current and maintain at least battery voltage at the low generator speeds.

As engine speed increases, the output capacity of the generator to supply load also increases. At some predetermined speed of the engine 41, and at a predetermined load, the current output of armatures 32 and 34 is sufficient to cause the closure of switch contacts 61 by reason of the fact that coil winding 60 is energized sufficiently to pull the armature 57 downwardly to close the contacts. It can be seen that the closure of switch contacts 61 is determined by the current output of the armature as the coil winding 60 is connected in series with both armature windings and in series with storage battery 77a through the current regulator 65 and through cutout relay 66. The generator current supplied to the other electrical loads of the vehicle (not shown) also passes through coil 60. When the current output of armature windings 32 and 34 energizes coil winding 60, the contacts 61 close as has been noted above. The closure of contacts 61 completes a circuit to ground for coil winding 49 of relay 48 so that the armature 52 is moved downwardly by a magnetic attraction to close switch contacts 53 and 55 and open contacts 54. The circuit for coil winding 49 may be traced from lead 46 through lead 90, thence through coil winding 49, through lead 93, through switch contacts 61, through the frame 62 of relay 56 and thence to ground via lead 63. The closure of contacts 53 and 55 and the opening of contacts 54 shifts the connection of armatures 32 and 34 from a series connection to a parallel connection. Thus, when the current output of the two armature windings is above a predetermined value, the armature windings are shifted from a series to a parallel connection as has been described above. When this current output is below a second predetermined lower value, the energization of coil winding 60 is not sufficient to hold switch contacts 61 closed and these contacts then open to set into motion a series of switching actions that shift the armature windings from a parallel connection back to a series connection.

The voltage regulating relay 64 operates to maintain the output voltage of the armatures 32 and 34 at a predetermined value. During certain periods of time the armature 67 is vibrated to rapidly open and close the switch contacts connecting metal parts 67b and 68. When these switch contacts are open, the field winding 88 is connected to ground through the resistor 84 via current regulating switch contacts 73 which are at this time in a closed position. When the lower set of contacts of voltage regulating relay 64 are closed, the field winding 88 is connected directly to ground via current regulating contact 73 and via the core 69 of relay 64. These contacts open and close in a rapid manner as is well known to those skilled in the art and control the current flow through field winding 88 by alternately connecting the field winding directly across the output of armature windings 32 and 34 and connecting the regulating resistance 84 in series with the field winding 88 across the output terminals of armatures 32 and 34. During certain other periods of operation, the armature 67 is moved to alternately open and close a circuit between metal parts 67a and 68. When metal parts 67a and 68 are connected through the upper switch contacts of the voltage regulating relay, the field winding 88 is substantially short circuited to decrease the energization of the field winding. During the time that metal parts 67a and 68 are disconnected, the field winding is connected to ground through regulating resistance 84. It will be appreciated that operation of the voltage regulating relay 64 depends upon the energization of coil winding 70 which is connected to respond to the output voltage of the series or parallel connected armature windings 32 and 34 in a manner that is well known to those skilled in the art. It will also be appreciated that when voltage regulation is required, the current regulating contacts 73 remain in a closed position.

When current regulation is required, the relay contacts 73 open and close at a rapid rate as is well known to those skilled in the art. When current regulating contacts 73 are closed, one side of field winding 88 is connected directly to ground through switch contacts 73 and through the lower set of contacts of voltage regulating relay 64. At this time the lower set of the contacts of voltage regulating relay 64 are held closed by spring 71. When switch contacts 73 are opened by magnetic attraction, due to a predetermined energization of coil winding 75, one side of the field coil winding 88 is connected through resistors 84 and 85 to ground, thus decreasing the energization of the field winding 88 and decreasing the voltage output of armature windings 32 and 34. The opening and closing of current regulating contacts 73 thus controls the voltage output of armatures 32 and 34 by either connecting the field coil winding 88 directly across the output terminals of the generator or by connecting the field winding and a pair of resistors in series therewith across the output terminals of the generator.

The cut-out relay 66 operates in the usual conventional fashion in that it closes contacts 77 to complete a circuit to storage battery 77a whenever coil windings 79 and 80 are energized with predetermined current and voltage. Thus, when the output voltage of armatures 32 and 34 exceeds the battery voltage the contacts 77 will be closed to connect the storage battery with the generator armature windings. It will be appreciated that the generator armature windings also supply various other electrical loads in addition to the storage battery which are not shown.

It can be seen that the circuit diagram of FIG. 3 provides an arrangement for alternately connecting the armature windings 32 and 34 either in series or in parallel depending upon the current output of the armature windings. It will also be apparent that the circuit arrangement of FIG. 3 contains suitable regulating apparatus for controlling both the current and voltage outputs of the armature windings 32 and 34 irrespective of whether they are connected in series or in parallel.

Figure 4:
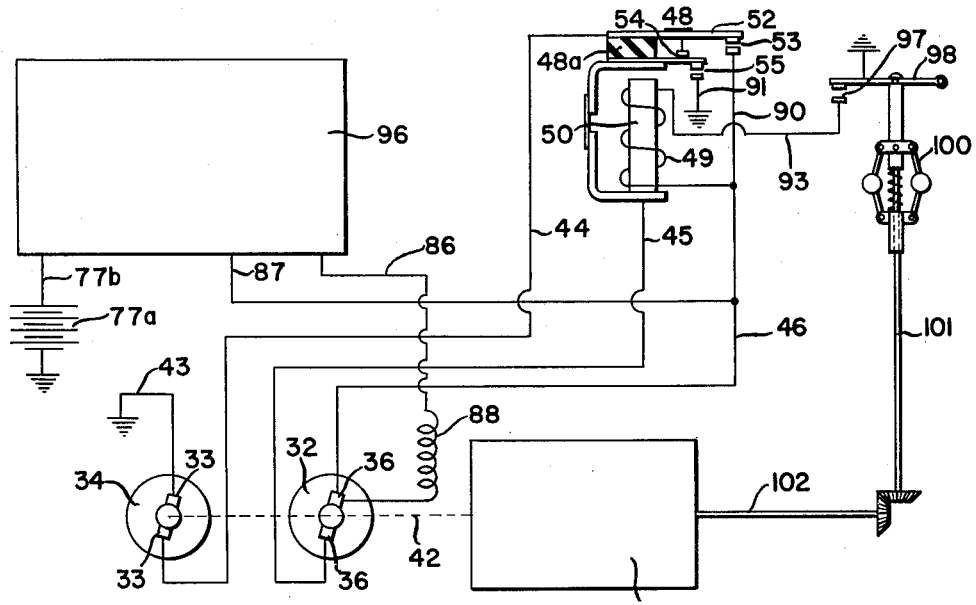
FIG. 4 is a circuit diagram illustrating a motor vehicle electrical system employing the generator of FIG. 1 and wherein the armature windings of the generator are connected either in series or in parallel in response to the rotational speed of the engine that drives the generator.

Referring now to FIG. 4, a modified arrangement for changing the connections of the armature windings 32 and 34 from series to parallel and back to series is illustrated. In this figure the same reference numerals as those used in FIG. 3 have been employed to identify the same circuit elements. In FIG. 4 the voltage and current regulators 64 and 65 and the cut-out relay 66 have been designated in their entirety by reference numeral 96. It is seen that the device represented by reference numeral 96 has three leads 77b, 87 and 86 which correspond to the same leads shown in FIG. 3. These leads are thus connected with the voltage and current regulating apparatus and a cut-out relay in a manner illustrated in FIG. 3. The circuit arrangement of FIG. 4 differs from that in FIG. 3 only in the means for controlling the energization of relay coil 49 which, in turn, controls the switching of the armature windings 32 and 34. Thus in FIG. 4 the lead 93 is connected with switch contacts 97, one of which is attached to a movable member 98. The movable member 98 is connected directly to ground as shown, and is operated by a centrifugal flyweight mechanism 100 of any well-known construction. The flyweight mechanism is driven by a shaft 101 which is, in turn, driven by a shaft 102 connected with engine 41. With this arrangement the switch contacts 97 will be closed at some predetermined engine speed to shift the connections of the armature windings 32 and 34 from a series connection to a parallel connection. When the engine speed falls below this predetermined speed, the contacts 97 are opened so that the armature windings 32 and 34 are once more connected in series.

Figure 5:
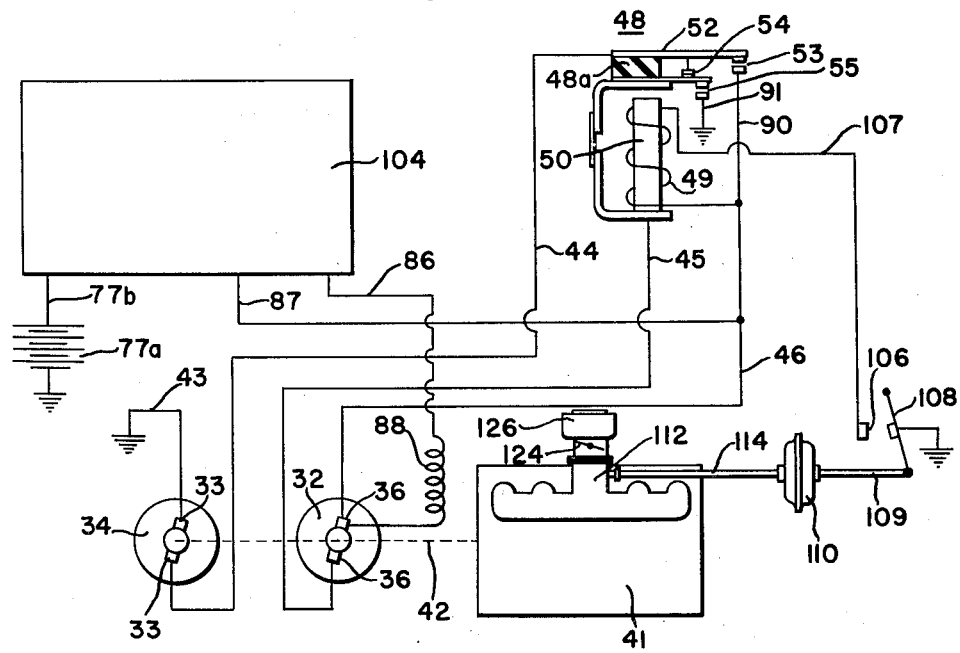
FIG. 5 is a control circuit diagram illustrating a motor vehicle electrical system employing the generator of FIG. 1 and wherein the armature windings of the generator are connected either in series or in parallel in response to manifold pressure of the engine that drives the generator.

In FIG. 5 still another modified arrangement for controlling the connection of the armature windings 32 and 34 is illustrated. In this figure the reference numeral 104 designates the current and voltage regulating circuit and the cut-out relay circuit which is identical with the circuit illustrated in FIG. 3. In the arrangement of FIG. 5 switch contacts 106 are connected between ground and a lead 107 that is connected to one side of coil winding 49. The movable switch contact of switch contacts 106 is carried by a movable member 108 that is connected to be moved by a shaft 109. The shaft 109 is connected with the diaphragm of a conventional vacuum motor 110. The actuating chamber of the vacuum motor is connected with the intake manifold 112 of engine 41 by means of a pipe or conduit 114. In the arrangement of FIG. 5 the shifting of the armature windings 32 and 34 from series to parallel and vice versa is controlled by manifold vacuum pressure. Thus when the vacuum pressure in manifold 112 reaches some predetermined value, the switch contacts 106 are closed to complete a circuit for relay coil winding 49. When coil winding 49 is energized, it closes contacts 53 and 55 and opens contacts 54 in a manner hereinbefore described to shift the connection of the armature windings from series to parallel. When the vacuum pressure is decreased, the switch 108 opens to set into motion a series of switching actions described above that switches the armature windings from parallel back to series. The same reference numerals have been used in FIG. 5 as were used in FIG. 3 to denote identical parts in each figure.

Figure 6:
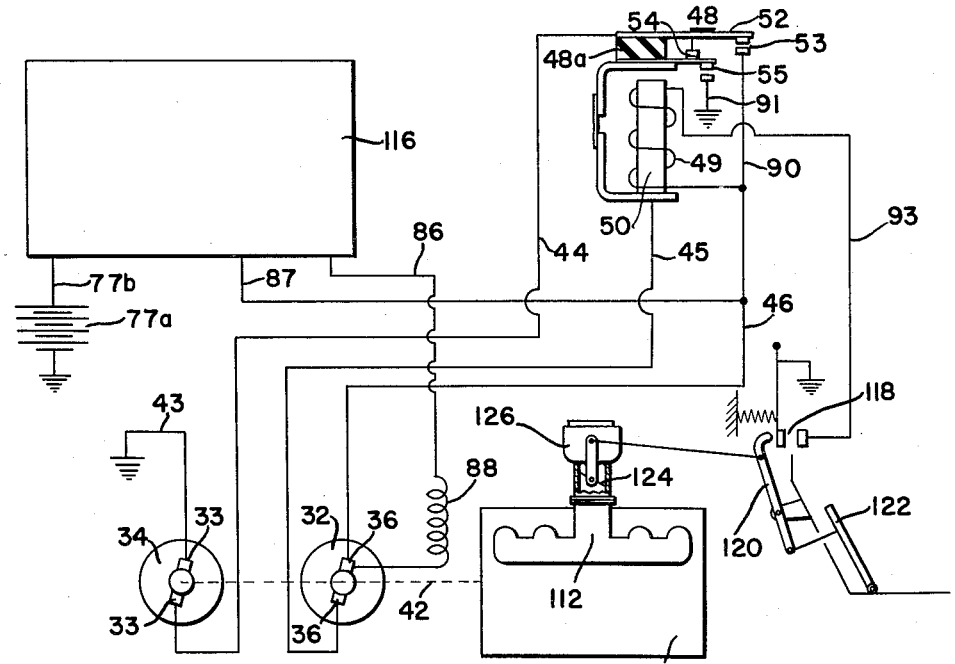
FIG. 6 is a circuit diagram illustrating a motor vehicle electrical system employing the generator of FIG. 1 and wherein the armature windings of the generator are connected either in series or in parallel in response to throttle position of the engine that drives the generator.

In FIG. 6 still another modified arrangement for shifting the connection of armature windings 32 and 34 is illustrated. As in the case of FIGS. 4 and 5, the same reference numerals have been used in FIGS. 6 and 3 to identify identical parts. In FIG. 6 the reference numeral 116 indicates the voltage and current regulating relays 64 and 65 and the cut-out relay 66. In FIG. 6 the energization of relay coil 49 is controlled by switch contacts 118, one of which is grounded, as shown, and which is movable by a pivoted arm 120. The arm 120 is mechanically connected with the accelerator pedal 122 of a motor vehicle and is also connected with the butterfly valve 124 of a motor vehicle carburetor designated by reference numeral 126. When the accelerator pedal 122 is depressed a certain amount, the contacts 118 are closed to complete a circuit to ground for relay coil 49. The energization of relay coil 49, as has been described hereinbefore, operates to close contacts 53 and 55 and to open contacts 54 thus shifting the connection of armature windings 32 and 34 from series to parallel. This shifting will occur when the accelerator pedal is depressed a certain predetermined amount. When the accelerator pedal is not depressed this amount, the switch contacts 118 are open and the armature windings are then connected in series.

Figure 7:
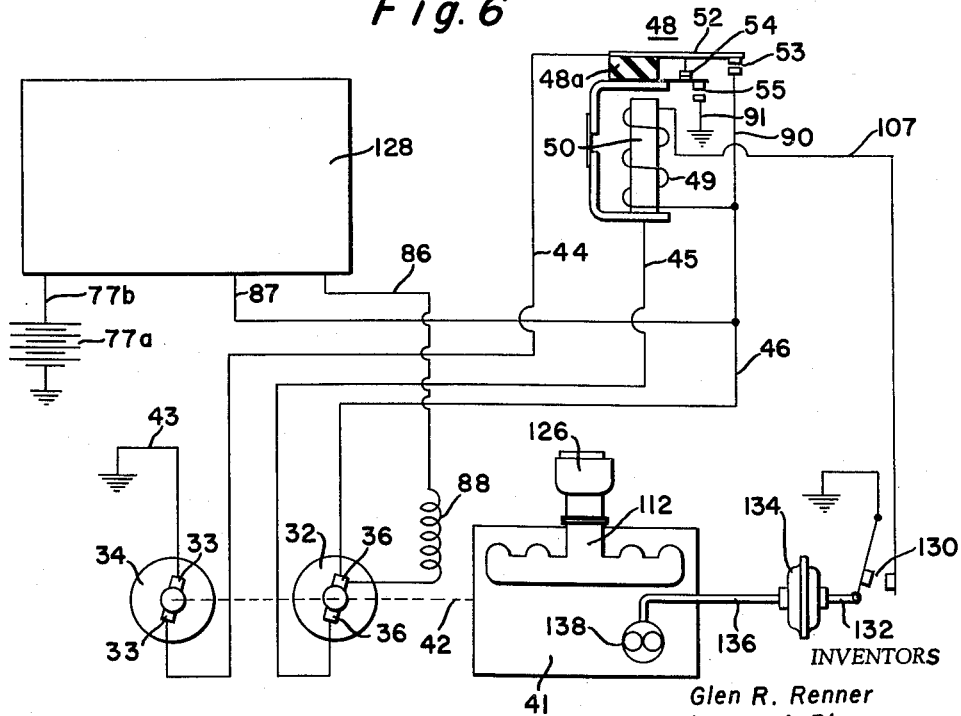
FIG. 7 is a control circuit diagram illustrating a motor vehicle electrical system employing the generator of FIG. 1, and wherein the armature windings of the generator are connected either in series or in parallel in response to the oil pressure of the engine that drives the generator.

In FIG. 7 still another modified arrangement for controlling the shifting of the armature windings 32 and 34 from a series to a parallel connection and vice versa is illustrated. In this figure, the reference numeral 128 has been used to designate a voltage and current regulating circuit and a cut-out relay that is identical to that shown in FIG. 3. The same reference numerals have been used in FIGS. 3 and 7 to identify identical parts in each figure. In the embodiment of FIG. 7 the energization of coil 49 is controlled by switch contacts 130, one of which is connected directly to ground, as shown, and which is connected to be moved with a rod 132. The rod 132 is connected with the diaphragm of a conventional fluid pressure actuated motor 134. The actuating chamber of the fluid motor 134 is connected by means of a pipe 136 to the outlet side of an oil pump designated by reference numeral 138. When the pump 138 is putting out a predetermined pressure, the fluid motor 134 operates to close contacts 130. This completes a circuit to ground for relay coil 49 and thus initiates the switching of the armature windings 32 and 34 from a series to a parallel connection. When the pressure of the oil in pipes 136 is below this predetermined value, the contacts 130 are opened. When the switch contacts 130 are open, the coil 49 is deenergized and the armature windings are thus connected in series. It can be seen from the foregoing that with the arrangement of FIG. 7 the connection of the armature windings is controlled by the pressure of the oil in pipe 136.

It will be appreciated that when the generator armatures are connected in series the voltage outputs thereof are additive and that total output is equal to twice the output of one armature winding. The total load current passes through both armature windings when series connected. When the armature windings are connected in parallel the voltage output is equal to the output voltage of one armature winding. With a parallel connection the total load current is split equally between the armature windings.

By using the hereinbefore-described two-commutator generator and switching arrangement therefor, the loads of the motor vehicle may be adequately supplied at all engine speeds without resorting to driving the generator at an excessive or dangerous speed during high speed operation of the vehicle. With the generator of this invention much better commutation is experienced as compared with previously used generators.

While the embodiments of the present invention as herein disclosed constitute a preferred form, it is to be understood that other forms might be adopted.

What is claimed is as follows:

1. In a motor vehicle electrical system, the combination comprising, a variable speed engine, a direct-current generator having a field winding and an armature connected to be driven by said engine, said armature having first and second armature windings and first and second commutators that are connected respectively with a respective armature winding, a load circuit, switch means operating in response to the speed of said engine for at times connecting said armature windings in parallel with each other and with said load circuit and for at other times connecting said armature windings in series with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

2. In a substantially constant voltage motor vehicle electrical system, the combination comprising, a variable speed engine, a direct-current generator having a field winding and an armature connected to be driven by said engine, said armature having first and second armature windings and first and second commutators that are connected respectively with a respective armature winding, a load circuit, switch means operable in response to a condition of operation of said engine for at times connecting said armature windings in parallel with each other and with said load circuit and for at other times connecting said armature windings in series with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

3. In a motor vehicle electrical system, the combination comprising, a variable speed engine having a manifold, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means responsive to manifold pressure in said manifold for at times connecting said armature windings in parallel with each other and with said load circuit and for at other times connecting said armature windings in series with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

4. In a motor vehicle electrical system, the combination comprising, a variable speed engine, throttle mechanism for controlling the operation of said engine, manual means for operating said throttle mechanism, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means responsive to the amount of opening of said throttle mechanism for at times connecting said armature windings in parallel with each other and with said load circuit and for at other times connecting said armature windings in series with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearig across said load circuit.

5. In a motor vehicle electrical system, the combination comprising, a variable speed engine, an oil pump having an outlet and connected to be driven by said engine, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means responsive to oil pressure at the outlet of said pump for at times connecting said armature windings in parallel with each other and with said load circuit and for at other times connecting said armature windings in series with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

6. In a motor vehicle electrical system, the combination comprising, a variable speed engine, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means for at times connecting said armature windings in series with each other and with said load circuit and for at other times connecting said armature windings in parallel with each other and with said load circuit, means responsive to the magnitude of current flow from said armature windings for operating said switch means to connect said armature windings in series when said current is below a first predetermined value and for operating said switch means to connect said armature windings in parallel when said current is above a second higher predetermined value, and voltage regulating means including voltage sensing means connected with said load circuit for controlling the energization of said field winding from the load circuit in response to the voltage appearing across said load circuit, said voltage regulating means operating to maintain the voltage across said load circuit substantially constant irrespective of whether said armatures are connected in series or parallel.

7. In a motor vehicle electrical system, the combination comprising, a variable speed engine, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means for at times connecting said armature windings in series with each other and with said load circuit and for at other times connecting said armature windings in parallel with each other and with said load circuit, means responsive to the magnitude of current output of said armature windings for controlling said switch means to maintain said armature windings in a series connection when said current is below a predetermined value and for operating said switch means to connect said armature windings in parallel when said current is above said predetermined value, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

8. In a motor vehicle electrical system, the combination comprising, a variable speed engine, a direct-current generator having a field winding and an armature connected to be driven by said engine, said armature having first and second armature windings, first and second commutators rotatable with said armature, said first commutator being connected with said first armature winding and said second commutator being connected with said second armature winding, a load circuit, switch means for at times connecting said armature windings in series with each other and with said load circuit and for at other times connecting said armature windings in parallel with each other and with said load circuit, and voltage regulating means connected with said load circuit and field winding for controlling energization of said field winding from said load circuit to maintain a constant voltage across said load circuit when said armature windings are connected in series or in parallel, said voltage regulating means including sensing means connected to sense the voltage appearing across said load circuit.

9. In a motor vehicle electrical system, the combination comprising, a variable speed engine, means connected to be driven by said engine providing first and second sources of direct-current voltage, control winding means for controlling said sources of voltage as a function of current flow therethrough, a load circuit, switch means for at times connecting said voltage sources in series with each other and with said load circuit and for at other times connecting said voltage sources in parallel with each other and with said load circuit, means responsive to the current output of said voltage sources for controlling said switch means to maintain said voltage sources in a series connection when said current output is below a predetermined value and for operating said switch means to connect said voltage sources in parallel when said current output is above said predetermined value, and voltage regulating means for controlling the energization of said control winding means from said load circuit to maintain a substantially constant voltage across said load circuit when said voltage sources are connected either in series or in parallel, said voltage regulating means including sensing means connected to sense the voltage appearing across said load circuit.

10. In an electrical system for an engine propelled vehicle, the combination comprising, a variable speed engine, a dynamoelectric machine having first and second output windings and a field winding, means drivably connecting said egine ad said dynamoelectric machine, a load circuit, a load requiring a substantially constant voltage connected to be energized by said load circuit, switch means for connecting said output windings in parallel with each other to supply said load circuit and for connecting said output windings in series with each other to supply said load circuit, and voltage regulating means connected with said load circuit and field winding for controlling energization of said field winding from said load circuit to maintain a constant voltage across said load circuit when said output windings are connected in series or in parallel, said voltage regulating means including sensing means connected to sense the voltage appearing across said load circuit.

11. In an electrical system for an engine propelled vehicle, the combination comprising, a variable speed engine, a dynamo-electric machine having first and second output windings and a field winding, means drivably connecting said engine and said dynamoelectric machine, a load circuit, a load requiring a substantially constant voltage connected to be energized by said load circuit, switch means operable in response to a condition of operation of said engine for at times connecting said output windings in parallel with each other to supply said load circuit and for at other times connecting said output windings in series with each other to supply said load circuit, and voltage regulating means connected with said load circuit and field winding for controlling energization of said field winding from said load circuit to maintain a constant voltage across said load circuit when said output windings are connected in series or in parallel, said voltage regulating means including sensing means connected to sense the voltage appearing across said load circuit.

12. The electrical system according to claim 10 wherein the switch means is operable in response to current output of said output windings.

13. The electrical system according to claim 10 wherein the switch means is operable in response to manifold pressure of said engine.

14. The electrical system according to claim 10 wherein the switch means is operable in accordance with engine throttle setting.

15. The electrical system according to claim 10 wherein the switch means is operable in accordance with engine oil pressure.

16. The electrical system according to claim 10 wherein the switch means is operable in accordance with engine speed.

17. In an electrical system for an engine propelled vehicle, the combination comprising, means connected to be driven by said engine providing first and second sources of voltage, control winding means for controlling said sources of voltage as a function of current flow therethrough, a load circuit, a load energized from said load circuit requiring a substantially constant voltage, switch means for at times connecting said voltage sources in series to supply said load circuit and for at other times connecting said voltage sources in parallel to supply said load circuit, and voltage regulating means for controlling the energization of said control winding means from said load circuit to maintain a substantially constant voltage across said load circuit when said voltage sources are connected either in series or parallel, said voltage regulating means including sensing means connected to sense the voltage appearing across said load circuit.

18. In a substantially constant voltage load vehicle electrical system, the combination comprising, a variable speed engine, a direct current generator having a field winding and an armature connected to be driven by said engine, said armature having first and second armature windings and first and second commutators that are connected respectively with a respective armature winding, a load circuit, means connected between said commutators and said load circuit including switching means for connecting said armature windings in parallel with each other and with said load circuit and for connecting said armature windings in series with each other and with said load circuit, and voltage regulating means for controlling the energization of said field winding from said load circuit to maintain a substantially constant voltage across said load circuit when said armature windings are connected either in series or in parallel, said voltage regulating means including sensing means connected to sense the voltage appearing across said load circuit.

19. In a substantially constant voltage vehicle electrical system, the combination comprising, a variable speed engine, a direct current generator having field winding and an armature connected to be driven by said engine, said armature having first and second armature windings of an equal number of turns, first and second commutators rotatable with said armature, said first commutator being connected with said first armature winding and said second commutator being connected with said second armature winding, a load circuit including a storage battery, means connected between said commutators and said load circuit including switching means for at times connecting said armature windings in parallel with each other and with said load circuit and for at other times connecting said armature windings in series with each other and with said load circuit, and voltage regulating means for controlling the energization of said field winding from said load circuit to maintain a substantially constant voltage across said load circuit when said armature windings are connected either in series or in parallel, said voltage regulating means including sensing means connected to sense the voltage appearing across said load circuit.

References Cited in the file of this patent

UNITED STATES PATENTS

| | | |
|---|---|---|
| 390,906 | Ries | Oct. 9, 1888 |
| 517,105 | Henderson | Mar. 27, 1894 |
| 613,882 | Green | Nov. 8, 1898 |
| 1,196,774 | Girvin | Sept. 5, 1916 |
| 2,476,373 | Hobart | July 19, 1949 |
| 2,506,809 | Nims | May 9, 1950 |
| 2,898,542 | Wasko et al. | Aug. 4, 1959 |